United States Patent [19]

Miura

[11] 4,187,338
[45] * Feb. 5, 1980

[54] METHOD FOR PRODUCING A FOAMED BODY HAVING CHEMICALLY EMBOSSED PATTERNS

[75] Inventor: Nobuo Miura, Kashiwa, Japan

[73] Assignee: Lonseal Corporation, Tokyo, Japan

[*] Notice: The portion of the term of this patent subsequent to Apr. 4, 1978, has been disclaimed.

[21] Appl. No.: 867,033

[22] Filed: Jan. 5, 1978

Related U.S. Application Data

[63] Continuation-in-part of Ser. No. 659,104, Feb. 18, 1976, Pat. No. 4,082,876.

[30] Foreign Application Priority Data

Feb. 20, 1975 [JP] Japan .................. 50-21655

[51] Int. Cl.² .................................. B29D 27/00
[52] U.S. Cl. ........................ 428/159; 264/52; 264/54; 264/DIG. 18; 264/DIG. 82
[58] Field of Search ............ 264/52, 54, DIG. 82, 264/DIG. 18; 428/170, 159

[56] References Cited

U.S. PATENT DOCUMENTS

| | | | |
|---|---|---|---|
| 3,365,353 | 1/1968 | Witman | 264/DIG. 82 |
| 3,453,171 | 7/1969 | Crowley | 264/DIG. 82 |
| 3,519,527 | 7/1970 | Crowley | 264/DIG. 82 |
| 3,538,204 | 11/1970 | Grubb et al. | 264/DIG. 82 |
| 3,800,013 | 3/1974 | Allan | 264/52 |
| 3,804,933 | 4/1974 | Allan et al. | 264/52 |
| 3,819,438 | 6/1974 | Witman | 264/52 X |
| 3,823,214 | 7/1974 | Allan et al. | 264/52 |
| 3,857,915 | 12/1974 | Crowley | 264/52 |

*Primary Examiner*—Philip Anderson
*Attorney, Agent, or Firm*—Oblon, Fisher, Spivak, McClelland & Maier

[57] ABSTRACT

Foamed bodies having chemically embossed patterns are prepared by a first method comprising forming a composition containing a vinyl chloride resin, a synthetic rubber material capable of forming sulfur bridges, a blowing agent, a vulcanizing agent (sulfur) and a vulcanization promotor (metal oxide) into a sheet, printing an ink containing a vulcanizing accelerator into a desired configuration onto the sheet, drying and curing the printed sheet and then heating the sheet to decompose the blowing agent thereby foaming the sheet; and a second method comprising forming a composition containing a vinyl chloride resin, a synthetic rubber containing terminal groups capable of reacting with an isocyanate, and a blowing agent, printing an ink containing an isocyanate into a desired configuration onto the sheet, drying the printed sheet and then heating the sheet to decompose the blowing agent thereby foaming the sheet.

25 Claims, 2 Drawing Figures

METHOD FOR PRODUCING A FOAMED BODY HAVING CHEMICALLY EMBOSSED PATTERNS

CROSS-REFERENCE TO RELATED APPLICATIONS

This application is a continuation-in-part of application Ser. No. 659,104, filed Feb. 18, 1976 now Pat. No. 4,082,876.

BACKGROUND OF THE INVENTION

1. Field of the Invention

This invention relates to a process for preparing a foamed body having chemically embossed patterns. More particularly, the present invention relates to chemicaly embossed patterns derived from sheets containing natural or synthetic rubber and a vinyl chloride resin.

2. Description of the Prior Art

In general, there are two methods for forming embossed patterns. One is the so-called "Valley" printing method in which embossing is effected simultaneously with printing, and the other is the so-called chemical-embossing method. Many proposals have been made particularly with regard to the latter method, as described in U.S. Pat. No. 3,293,094 and Japanese Patent Publication No. 43-28636, for example, which disclose methods for producing embossed patterns in which the surface of a sheet of an unfoamed resin composition containing a blowing agent, is printed with an ink which contains a decomposition inhibitor. The latter ingredient inhibits the decomposition of the blowing agent, so that the decomposition process at the printed surfaces is retarded whereby embossed patterns are produced. Japanese Patent Publication No. 43-15713 discloses a method for producing printed chemically embossed patterns in which a sheet of an unfoamed resin composition containing a blowing agent is printed with an ink which contains at least one substance which functions to lower the decomposition temperature of the blowing agent, such as a so-called "kicker" or the like. As a result, the foaming process at the printed surfaces is accelerated resulting in an embossing effect. In addition, U.S. Pat. No. 3,804,933, and Japanese Laid-Open Patent Applications No. 48-84158 and 49-105853 disclose methods for producing printed chemically embossed patterns which utilize sheets of a monomer having unsaturated bonds or of an unfoamed resin composition containing a reactive plasticizer and a blowing agent. The surfaces of these sheets are printed with an ink containing peroxides or amines whereby the printed portions are inhibited from foaming, resulting in production of embossed patterns. However, the methods disclosed in the first three mentioned references require very precise control of the heating conditions used to decompose the blowing agents. Moreover, the methods of the last three mentioned references suffer from the disadvantage that evenness of the sheet is not assured because the surface finish depends greatly upon the degree of bridging in the composition. As a result, it is difficult to obtain a uniform sheet. Furthermore, since the thickness of the sheet is not constant or uniform, the printed portions often are discolored, e.g., are whitened, and become cracked.

Yet another technique of chemically embossing a plastic material is disclosed by Crowley, in U.S. Pat. No. 3,453,171, in which a polymeric resin such as a vinyl resin containing a synthetic or natural rubber component and also containing a blowing agent is coated in a pattern with an ink containing hardening or cross-linking agents for the polymeric and rubber components of the composition. Thus, materials such as peroxides, azo compounds, and the like are employed to cure the polymeric component while materials such as sulfur and zinc oxide are employed to vulcanize the rubber component of the plastic composition. Once the plastic composition is coated, it is embossed by heating the composition. In the regions coated by the ink containing hardening agents, foaming of the plastic composition is retarded relative to the uncoated areas thus effecting chemical embossing.

In addition to the above techniques disclosed by Crowley, it is also known when a natural or synthetic rubber containing a blowing agent having a decomposition temperature higher than the curing and cross-linking temperature is sufficiently cured and cross-linked under the described conditions and then is subjected to a temperature higher than the decomposition temperature of the blowing agent, foaming while controlled, hardly occurs. It is also known that a natural or synthetic rubber can be cross-linked or cured by sulfur, zinc oxide or the like and that a reactive monomer or a polymerizable monomer containing unsaturated groups can be cross-linked with organic peroxides and the like. However, despite the fact that a number of techniques are known by which chemical embossing can be effected, none of them are completely satisfactory because the preparation of an embossed pattern involves the control of a number of factors. Accordingly, a need continues to exist for an improved chemical embossing technique.

SUMMARY OF THE INVENTION

Accordingly, it is an object of the present invention to provide a method for chemically embossing a foamed composition whereby whitening and cracking of the surface does not occur, the conditions of control are suitable for industrial purposes and a uniform surface is obtained.

Briefly, this and other objects of this invention as hereinafter will become more readily apparent can be attained by providing a first method for producing a foamed body having chemically embossed patterns which comprises forming a composition containing a vinyl chloride resin, a synthetic rubber material capable of forming sulfur bridges, a blowing agent, a vulcanizing agent (sulfur) and a vulcanization promotor into a sheet, printing an ink containing a vulcanizing accelerator into a desired configuration onto the sheet, drying and vulcanizing the printed sheet and then heating the sheet to decompose the blowing agent thereby foaming the sheet; and a second method for producing a foamed body having chemically embossed patterns which comprises forming a composition containing a vinyl chloride resin, a synthetic rubber material containing terminal groups capable of reacting with an isocyanate, and a blowing agent into a sheet, printing an ink containing an isocyanate into a desired configuration on the sheet, drying the printed sheet and then heating the sheet to decompose the foaming agent thereby foaming the sheet.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
FIG. 1 is a section of an unfoamed sheet.

In earlier investigations by the present inventors in the cross-linking of soft vinyl chloride resin synthetic rubber blends it was found that it is very difficult to cure and cross-link such a blend of a soft vinyl resin and a synthetic rubber. In particular, when sulfur, zinc oxide or the like or a vulcanizing accelerator is added to such a blend, the blend is scorched at the processing temperature of the blend and processing is impossible. The problems of the earlier work have led to the present discovery that improved curing and development of a chemically embossed pattern can be achieved by incorporating a rubber vulcanizing agent such as sulfur and a vulcanization promotor such as zinc oxide into a resinous composition and thereafter applying a vulcanizing accelerator to the resinous composition. More specifically, the degree of curing in a sheet formed by adding a vulcanizing agent and a vulcanization promotor to a blend of a soft vinyl chloride resin and a synthetic rubber, and then applying an ink containing a vulcanizing accelerator to the surface of the sheet and subsequent curing thereof was examined in the following manner:

Sample A: A blend of the soft vinyl chloride resin and the synthetic rubber.

Sample B: A blend of the soft vinyl chloride resin, the synthetic rubber, the vulcanizing agent and the vulcanization promotor.

Sample C: A blend of the soft vinyl chloride resin, the synthetic rubber, the vulcanizing agent, the vulcanization promotor and the vulcanizing accelerator.

Sample A was shaped into a sheet having a thickness of 2 cm. Sample B was shaped into a sheet having a thickness of 2 cm, a vulcanizing accelerator-containing ink was applied to the surface of the sheet and the sheet was cured at 170° C. for 5 minutes. Sample C was shaped into a sheet having a thickness of 2 cm and the sheet was cured at 160° C. for 30 minutes. Each of the resulting sheets was swelled in a solvent (toluene) and the swelling degree was measured. The thickness X of the cured portion in the vulcanizing accelerator-containing ink applied sheet (Sample B situation) was calculated by the following formula:

$$X = \frac{VaBw - AwVb}{VaVb} \cdot \frac{VaVc}{CwVa - AwCc} \quad (1)$$

wherein Aw stands for the weight change by swelling in the sheet A (non-cured sheet), Bw stands for the weight change by swelling in sheet B (vulcanizing accelerator was applied to the non-cured sheet) and Cw stands for the weight change by swelling in the sheet C (cured sheet), and Va, Vb, and Vc are volumes of tested sheets A, B, C, respectively. Assuming that Va, Vb and Vc are equal to each another, the above formula (1) can be rewritten as follows:

$$X = \frac{Bw - Aw}{Cw - Aw} = \frac{Aw - Bw}{Aw - Cw} \quad (2)$$

It was found that in the case of Sample B, the curing thickness X (curing depth) was 0.8 mm. For samples in which the thickness of sheets A, B and C are 2.0 cm, the depth of the cured portion is 0.8 mm from the surface of the sheet. Moreover, the degree of swelling of the sheets of the samples is the same for samples which are not coated with the ink containing a vulcanizing accelerator, which is applied to samples A and B.

The process of this invention differs from the conventional methods in that it substantially raises the melt viscosity at the printed portions of the composition to be foamed whereby whitening and cracking do not occur. This is achieved by adding rubber-like materials to the composition so that when the blowing agent is decomposed by the heat, the printed portions become highly viscous. More particularly, according to this invention, there is provided a process for producing chemically embossed patterns which comprises mixing a vinyl chloride resin, an appropriate synthetic rubber, which is highly compatible with the vinyl chloride resin and a plasticizer for the vinyl chloride resin, a plasticizer, a stabilizer, a lubricant, a blowing agent, other desirable conventional additives, a vulcanizing agent and a vulcanization promotor to formulate a composition which is then generally formed into a sheet. The vinyl-rubber composition contains from 20 to 60 parts by weight of a synthetic rubber component per 100 parts by weight of the vinyl chloride resin. Suitable synthetic rubber materials which are compatible with vinyl chloride resin and which are capable of forming sulfur bridges include acrylonitrile-butadiene rubber, chloroprene rubber, chlorosulfonated polyethylene and the like. The amount of vulcanizing agent employed ranges from 1–5 parts by weight per 100 parts by weight of the synthetic rubber component and is preferably sulfur. The amount of vulcanization promoter employed is not critical, but generally ranges from 0.2 to 10 parts per 100 parts by weight of the vinyl chloride resin. Suitable vulcanization promotors include magnesium oxide, zinc oxide, lead oxide, aluminum oxide, and the like. Zinc oxide is the preferred vulcanization promotor.

The scope of the vinyl chloride resin component of the composition of the present invention not only includes homopolymers of vinyl chloride, but also copolymers of vinyl chloride with other unsaturated monomers such as vinyl acetate, ethylene, propylene, acrylic acid ester, maleic acid ester and the like.

Suitable lubricants which are useful in the rubber based composition of the present invention include Adva Wax 280 (ethylene bis strearalo amide), Amide P (Polmitic amide), AC-Polyethylene (Low molecular weight polyethylene), F-3(purified stearic acid), Kalcohl (stearyl alcohol 85%, palmitile alcohol 15%), Hoechst Wax OP (partly saponified ester wax from montanic acid), and the like.

Suitable pigments include titanium dioxide, red iron oxide, cadmium yellow, carbon black, benzidine yellow, Hanso Yellow G, permanent red 4R, benzidine orange, brilliant carmine 3B, Lake red C, Cuperphthalocyanine green, phthalocyanine green, phthalocyanine blue, and the like.

Suitable stabilizers which can be employed in the rubber based composition of the present invention include metallic soaps such as barium stearate, barium laurate, magnesium stearate, magnesium laurate, zinc stearate, zinc laurate, and the like; organotin compounds such as dibutyl tin dilaurate, dibutyl tin maleate, dibutyl tin laurate-maleate complex, sulfur containing organic tin compounds, and the like; complex stabilizer powders such as calcium-zinc complex, a barium-zinc complex, and barium-zinc-magnesium; and complex stabilizer liquids such as a calcium zinc complex, a barium-zinc complex, and the like.

Suitable antioxidants which are useful in the rubber based composition of the present invention include BHT (3,5-di-tert-butyl hydroxy toluene), Ionox 100 (4-hydroxymethyl-2,6 ditertbutylphenol), Ionex 220 (4,4'-methylene-bis (2,6-ditert butylphenol)), TNP (trinonylated phenyl phosphite), and the like.

Suitable plasticizers which can be used in the present composition include DBP (dibutyl phthalate), DOP (di-2 ethyl hexyl phthalate), n-DOP (di-n-octyl phthalate), DIDP (diisodecyl phthalate), BBP (butyl benzylphthalate), DOA (di-2 ethyl hexyl adipate), DIDA (diisodecyl adipate), DOZ (dioctyl azelate), DOS (di-2 ethylhexyl sebacate), TOTM (tri-2 ethylhexyl trimellitate), TCP (tricresyl phosphate), chlorinated paraffins, epoxy derivatives, polymeric plasticizers, and the like.

The vinyl-rubber composition contains a blowing agent in an amount of 1.5 to 6 parts by weight per 100 parts by weight of the vinyl chloride resin whose function is to induce foaming of the applied composition when heated. The decomposition range of suitable blowing agents is from 150° C. to 250° C. Suitable blowing agents include dinitrosopentamethylene tetramine and azodicarbonamide which have a decomposition point over the preferred range of 180° C. to 210° C.

The vinyl-rubber composition which is applied as a sheet is then coated in the pattern or design desired with an ink containing a vulcanizing accelerator. The printed sheet is allowed to stand and the vulcanizing accelerator permeates into the sheet in the printed areas and is heated to a temperature ranging from 90° to 100° C. While the time over which the inked composition is not critical, it is generally for a period of greater than 20 hours. While the lower limit of 90° C. is not critical, since curing can be conducted at a temperature less than the decomposition temperature of the blowing agent, however, from the reproducability standpoint, it is preferred to cure the rubber based composition over the range of 90° to 100° C. This range is perferred also from the standpoint that the product can be cured over this range while it is in a wound state. The temperature is then elevated to a temperature sufficient to decompose the particular blowing agent present in the vinyl-rubber composition which normally ranges from 150° C. to 250° C. for a time sufficient to complete the blowing process, usually about 2 to 3 minutes. The result of the process is that an embossed sheet is obtained which possesses concave printed areas and convex non-printed areas.

Another type of vinyl-rubber based composition which can be formulated contains 20 to 60 parts by weight of a synthetic rubber material which contains reactive terminal groups such as OH which react with isocyanates, per 100 parts by weight of the vinyl chloride resin. Suitable reactive synthetic rubber materials which are compatible with vinyl chloride resins include butadiene-styrene copolymers, and butadiene-acrylonitrile copolymers having reactive terminals such as OH groups and the like. Of course, the vinyl-rubber based composition can contain the same amounts and types of other additives such as plasticizers, pigments, lubricants, stabilizers and the like as the rubber based composition which does not contain isocyanate reactive groups. However, the reactive rubber based composition does not contain a curing agent or a curing assistant.

The printing ink which is applied to the sheet of vinyl-rubber composition contains a vulcanizing accelerator or an isocyanate depending upon the type of vinyl-rubber composition to be printed. The amounts of vulcanizing accelerator or isocyanate present in the ink range from 7-30 wt.% and 3-30 wt.%, respectively. The type of solvent employed as the liquid vehicle for the ink is not critical since the only requirement is that it have the ability not only to solubilize the vulcanizing accelerator, but also the vinyl chloride resin component of the rubber based composition. Suitable solvents include tetrahydrofuran, cyclohexanone, acetone, methylethylketone, methyl-i-butylkeone, dioxane, and ethyl acetate. Diluents may also be added to the ink such as toluene, petroleum spirits, petroleum naphtha, and the like. Other additives which can also be combined with the components of the ink beside the basic vulcanizing accelerator include plasticizers, stabilizers, pigments and a resin vehicle. Suitable vulcanizing accelerators for use in the ink include thiazoles such as 2-mercaptobenzothiazole, thiurams such as tetramethylthiuramdisulfide, dithiocarbamates such as piperidine-pentamethylene-dithiocarbamate, xanthates such as dibutyl-zinc-xanthate, and mixtures thereof. When the vinyl-rubber composition contains a rubber material which contains reactive terminal OH groups, the ink contains an isocyanate including toluene diisocyanates such as 2,4-toluene diisocyanate (Desmodur+);diphenylsocyanate, an aliphatic polyisocyanate, a low molecular weight prepolymer containing terminal isocyanate groups, polymethylene polyphenyl isocyanates (Millionate MR), polyfunctional aliphatic isocyanates and the like.

The vulcanizing accelerator in the ink composition promotes the curing and cross-linking of the rubber in the plasticized vinyl chloride resin. More specifically, when the printed sheet is allowed to stand at a temperature of 90° C. to 100° C., the accelerator causes semi-cross-linking of the rubber while at the decomposition point of the blowing agent, the accelerator promotes complete cross-linking of the rubber component. Moreover, the accelerator may decrease the decomposition temperature of the blowing agent or it may have no influence on the blowing agent. Thus, if sodium containing accelerators are used in the printing ink, the blowing agents may decompose at a temperature as low as under 100° C. If zinc containing accelerators are used, the blowing agents may decompose at temperatures as low as less than 130° C. If other types of above disclosed accelerators are used, the decomposition temperature of the blowing agent is not significantly affected. Thus, in the method of the present invention, complete curing and cross-linking of the printed areas are accomplished. Moreover, the dimensional stability in the printed pattern of the vinyl-rubber sheet is very good and the product exhibits excellent cushioning properties.

Figure 2:
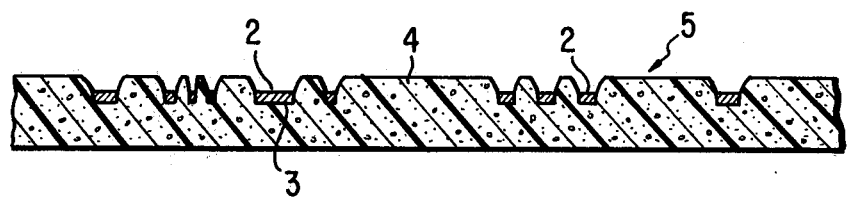
FIG. 2 is a foamed sheet having embossed patterns.

Referring to FIG. 1, a sheet 1 is first prepared by blending vinyl chloride resin, plasticizer, stabilizer, pigment, lubricant, blowing agent, sulfur, synthetic resin and other desirable additives. The surface of the sheet 1 is printed with an ink 2 containing a vulcanizing accelerator. The accelerator permeates into the sheet at the printed portions causing bridging in the synthetic rubber material located beneath the printed sections. Referring to FIG. 2, when the synthetic rubber is heated to the decomposition temperature of the blowing agent, the melt viscosity at the bridged portions 3 is higher than that at the non-bridged portions 4 due to the difference in molecular structure. Therefore, the number and size of the foam cells produced at the bridged portions 3 are much smaller than those for the foam cells produced at the non-bridged portions. For this reason, the sheet 5 obtained contains regions of differing height. The printed portions are concave and the non-printed portions are convex resulting in formation of chemically embossed patterns.

Referring also to FIG. 1, the process in which isocyanate bridges are formed in the embossing process will be discussed. Vinyl chloride resin, a plasticizer, a stabilizer, a pigment, a lubricant and a synthetic rubber containing isocyanate reactive terminal groups are first mixed and formed into a sheet. The surface of the sheet 1 is printed with an ink 2 containing isocyanate groups. The isocyanate permeates into the sheet composition and cuases the formation of isocyanate bridges in the areas of the sheet located beneath the printed portions. When the composition is heated to the decomposition temperature of the foaming agent, as is the case with the sulfur bridge process, the melt viscosity at the non-bridged portions 3 is higher than that at the non-bridged portions 4 due to the difference in molecular structure. Therefore, the foam cells produced at the bridged portions 3 are more minute and are smaller in number than are those produced at the non-bridged portions 4. As a result, the bridged portions do not swell as do the non-bridged portions. For this reason, the sheet 5 obtained contains regions of differing heights. The printed portions are concave and the non-printed portions are convex, resulting in the formation of chemically embossed patterns.

Having generally described this invention, a further understanding can be obtained by reference to certain specific examples which are provided herein for purposes of illustration only and are not intended to be limiting unless otherwise specified.

EXAMPLE 1

A composition comprising the following ingredients was kneaded and shaped in a sheet having a thickness of 0.5 mm.

| | Parts by Weight (phr) |
|---|---|
| Vinyl chloride resin (homopolymer, $\bar{p}$ = 800) (PVC) | 100 |
| Dioctyl phthalate (plasticizer) | 40 |
| Tricresyl phosphate (plasticizer) | 25 |
| Acrylonitrile-butadiene copolymer rubber (Hycar 1042 or Nipol 1042) | 30 |
| Barium-calcium organic soap (stabilizer) | 5 |
| Sulfur | 0.5 |
| Zinc oxide | 0.2 |
| Azodicarbonamide (blowing agent) | 3 |
| Titanium oxide | 10 |

The surface of the resulting sheet was gravure-printed by a printing ink having the following composition:

| | Parts by Weight (phr) |
|---|---|
| Vinyl chloride resin (copolymer, Geon 400 × 150 ML) | 100 |
| Dioctyl phosphate (plasticizer) | 30 |
| Tricresyl phosphate (plasticizer) | 10 |
| Epoxidized soybean oil (plasticizer, Adekacizer 0-120 | 5 |
| Calcium-barium fatty acid (stabilizer) | 5 |
| Methylethylketone | 200 |
| Cyclohexanone | 200 |
| Mineral Spirit | 200 |
| Piperidine pentamethylene dithiocarbamate (vulcanizing accelerator, Nocceler PPD) | 50 |
| Phthalocyanine Green (pigment) | 5 |
| Titanium dioxide (pigment) | 10 |

The printed sheet was allowed to stand at a temperature of 90° to 100° C. for more than 20 hours and then heated for 3 minutes at a temperature of 180° to 210° C. causing decomposition of the blowing agent. There was obtained a sheet in which printed areas were concaved and non-printed areas were convexed.

EXAMPLE 2

A composition comprising the following ingredients was mixed to form a paste sol:

| | Parts by Weight (phr) |
|---|---|
| Geon 121 (PVC paste resin) | 100 |
| Dioctyl phthalate (plasticizer) | 40 |
| Tricresyl phosphate (plasticizer) | 20 |
| Epoxidized soybean oil (plasticizer) | 10 |
| Poly Bd CN-15 (carboxyl terminated liquid rubber of acrylonitrile-butadiene copolymer) | 20 |
| Barium-calcium-zinc complex liquid stabilizer | 3 |
| Tin octoate (liquid stabilizer) | 2 |
| Titanium dioxide (pigment) | 10 |
| Mineral spirit | 5 |
| Azodicarbonamide (blowing agent) | 5 |

The above paste sol was cast onto an asbestos paper in a thickness of 0.5 mm and heated for 75 minutes in a thermostatically controlled air oven maintained at 140° to 150° C. to form a sheet having a semi-gelled coating. The sheet surface was gravure-printed with a printing ink having the following composition:

| | Parts by Weight (phr) |
|---|---|
| Geon 400 × 150 ML (vinyl chloride-vinyl acetate copolymer) | 100 |
| Dioctyl phthalate (plasticizer) | 30 |
| Tricresyl phosphate (plasticizer) | 10 |
| Epoxidized soybean oil (plasticizer) | 5 |
| Cadmium-barium complexed stabilizer | 5 |
| Methylethylketone | 200 |
| Mineral spirit | 200 |
| Cyclohexanone | 200 |
| 2,4-Toluene diisocyanate | 30 |
| Phthalocyanine Green (pigment) | 5 |
| Titanium dioxide (pigment) | 10 |

The printed sheet was then allowed to stand overnight, and a film having a thickness of 0.2 mm and comprising the following ingredients was applied to the printed surface:

|  | Parts by Weight (phr) |
| --- | --- |
| Vinyl chloride resin ($\bar{p}$ = 1000) | 100 |
| Dioctyl phthalate (plasticizer) | 40 |
| Tricresyl phosphate (plasticizer) | 10 |
| Cadmium-barium complexed stabilizer | 5 |

The film-applied sheet was exposed to a temperature of 180° to 200° C. for 2 to 3 minutes to decompose the blowing agent. By this technique was obtained a foamed sheet containing concave printed areas while the non-printed areas were convex shaped.

Having now fully described this invention, it will be apparent to one of ordinary skill in the art that many changes and modifications can be made thereto without departing from the spirit or scope of the invention as set forth herein.

What is claimed as new and desired to be secured by letters patent of the United States is:

1. A method for producing a foamed body having a chemically embossed pattern, which comprises:
    forming a composition containing a plasticized vinyl chloride resin, a synthetic rubber material capable of being vulcanized, a blowing agent, a vulcanizing agent and a vulcanization promotor into a sheet;
    printing an ink containing a vulcanizing accelerator onto said sheet in a desired configuration;
    drying and curing the printed sheet by heating said printed sheet to a temperature of up to 100° C.; and
    heating said dried sheet to a temperature of 150°-250° C. to cause foaming of said sheet thereby generating a sheet having said chemically embossed patterns therein.

2. The method of claim 1, wherein said blowing agent is dinitrosopentamethylenetretramine or azodicarbonamide.

3. The method of claim 1, wherein said vulcanization accelerator is 2-mercaptobenzothiazole, a zinc salt of 2-mercaptobenzothiazole, a sodium salt of 2-mercaptobenzothiazole, tetramethylthiuram monosulfide, tetramethylthiuran disulfide, piperidine-pentamethylene-dithiocarbamate, zinc diethyldithiocarbamate, or zinc-dibutyl-xanthate.

4. The method of claim 1, wherein said composition contains 20 to 60 parts by weight of said synthetic rubber material per 100 parts by weight of said vinyl chloride resin.

5. The method of claim 1, wherein said vulcanizing agent is sulfur and said vulcanization promotor is zinc oxide.

6. The method of claim 1, wherein said composition further comprises at least one additive selected from the group consisting of a stabilizer, a lubricant and a pigment.

7. The method of claim 1, wherein said dried sheet is foamed over a temperature of 180°-210° C.

8. The method of claim 1, wherein said printed sheet is dried and cured at a temperature of 90° C. to 100° C.

9. The method of claim 1, wherein said vinyl chloride resin is a homopolymer of vinyl chloride or a copolymer of vinyl chloride with vinyl acetate, ethylene, propylene, acrylic acid ester or maleic acid ester.

10. The method of claim 1, wherein said vulcanizing agent is sulfur.

11. The method of claim 1, wherein said rubber containing composition contains from 1.5 to 6 parts by weight of said blowing agent per 100 parts by weight of said vinyl chloride resin.

12. The method of claim 1, wherein the amount of said vulcanization promotor ranges from 0.2 to 10 parts by weight per 100 parts by weight of said vinyl chloride resin.

13. The method of claim 1, wherein the amount of said vulcanizing agent ranges from 1-5 parts by weight per 100 parts by weight of said synthetic rubber component.

14. The method of claim 1, wherein the amount of said vulcanizing accelerator in said ink ranges from 7-30 wt.%.

15. A method for producing a foamed body having chemically embossed patterns therein, which comprises:
    forming a composition of a plasticized vinyl chloride resin, a synthetic rubber material containing terminal groups capable of reacting with isocyanates and a blowing agent into a sheet;
    printing said sheet with an ink containing an isocyanate capable of reacting with said synthetic rubber into a desired configuration;
    drying said printed sheet; and
    heating said dried sheet to decompose the blowing agent in said composition thereby forming said foamed body containing a chemically embossed pattern therein.

16. The method of claim 15, wherein said isocyanate in said printing ink is a toluene diisocyanate, diphenylisocyanate, an aliphatic polyisocyanate, a low molecular weight prepolymer containing terminal isocyanate groups, a polymethylene polyphenyl isocyanate or polyfunctional aliphatic isocyanate.

17. The method of claim 15, wherein said rubber containing composition further comprises at least one additive selected from the group consisting of a stabilizer, a lubricant and a pigment.

18. The method of claim 15, wherein the amount of said isocyanate in said ink ranges from 3-30 wt.%.

19. The method of claim 15, wherein said vinyl chloride resin is a homopolymer of vinyl chloride or a copolymer of vinyl chloride with vinyl acetate, ethylene, propylene, acrylic acid ester or maleic acid ester.

20. The method of claim 15, wherein said rubber containing composition contains from 1.5 to 6 parts by weight of said blowing agent per 100 parts by weight of said vinyl chloride resin.

21. The method of claim 15, wherein said blowing agent is dinitroisopentamethylenetretramine or azodicarbonamide.

22. The method of claim 15, wherein said dried sheet is foamed over a temperature of 180°-210° C.

23. The method of claim 15, wherein said printed sheet is dried and cured at a temperature of 90° C. to 100° C.

24. An embossed foamed body prepared by the method of claim 1.

25. An embossed foamed body prepared by the method of claim 15.

* * * * *